(12) United States Patent
Bamberger et al.

(10) Patent No.: US 7,270,349 B2
(45) Date of Patent: Sep. 18, 2007

(54) QUICK-RELEASE COUPLING FOR PIPES

(75) Inventors: Michael Bamberger, Gailingen (DE); Peter Heer, Lottstetten (DE); Renato Pinardi, Schaffhausen (CH); Erasmo Porfido, Stetten (CH)

(73) Assignee: Georg Fischer Haustechnik AG, Schaffhausen (CH)

( * ) Notice: Subject to any disclaimer, the term of this patent is extended or adjusted under 35 U.S.C. 154(b) by 204 days.

(21) Appl. No.: 10/496,398

(22) PCT Filed: Nov. 20, 2002

(86) PCT No.: PCT/EP02/12998

§ 371 (c)(1),
(2), (4) Date: Oct. 15, 2004

(87) PCT Pub. No.: WO03/044416

PCT Pub. Date: May 30, 2003

(65) Prior Publication Data
US 2005/0035597 A1 Feb. 17, 2005

(30) Foreign Application Priority Data
Nov. 23, 2001 (DE) .................. 101 57 304
Mar. 21, 2002 (DE) .................. 102 12 735

(51) Int. Cl.
*F16L 21/06* (2006.01)

(52) U.S. Cl. .................. 285/322; 285/249; 285/257; 285/319

(58) Field of Classification Search ............ 285/243, 285/248–249, 251, 257, 322–323, 244, 247, 285/255, 319, 321
See application file for complete search history.

(56) References Cited

U.S. PATENT DOCUMENTS

| 1,802,572 | A | * | 4/1931  | Phillips ................. 285/249 |
| 3,214,200 | A | * | 10/1965 | Carlson et al. ............ 285/323 |
| 3,376,056 | A | * | 4/1968  | Linstead ................. 285/243 |
| 4,275,907 | A | * | 6/1981  | Hunt .................... 285/18 |
| 4,712,810 | A |   | 12/1987 | Pozzi |
| 4,722,558 | A | * | 2/1988  | Badoureaux ............. 285/39 |
| 5,553,901 | A |   | 9/1996  | Serot |
| 5,775,742 | A | * | 7/1998  | Guest ................... 285/323 |

* cited by examiner

*Primary Examiner*—Aaron Dunwoody
*Assistant Examiner*—Fannie C. Kee
(74) *Attorney, Agent, or Firm*—Bachman & LaPointe, P.C.

(57) ABSTRACT

A quick-action coupling for coupling pipes includes a tubular inner part having an outer surface for supporting a pipe to be coupled; an inner sleeve and a clamping ring, each surrounding at least a portion of the tubular inner part for clamping the pipe to be coupled between the outer surface of the tubular inner part and the clamping ring; a toothed ring between the inner sleeve and the clamping ring; and an outer sleeve surrounding at least a portion of the inner sleeve, the toothed ring and the clamping ring, the outer sleeve comprises a cylindrical region having at least two inside diameters ($d_1$, $d_2$) and a conical region, wherein the clamping ring is received in the conical region.

14 Claims, 19 Drawing Sheets

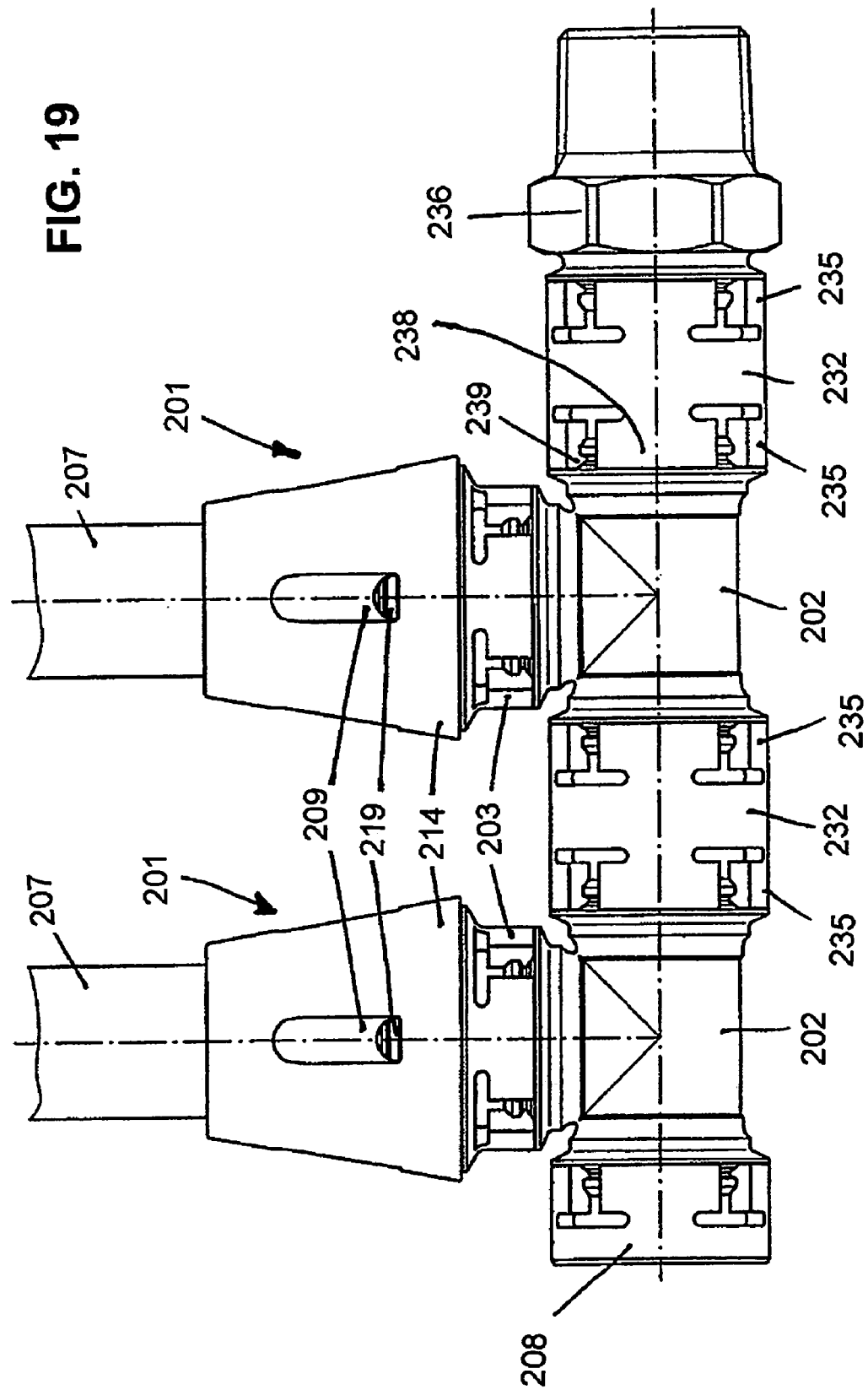

QUICK-RELEASE COUPLING FOR PIPES

BACKGROUND OF THE INVENTION

The invention relates to a quick-action coupling for pipes, with a tubular inner part, with an inner sleeve, with a clamping ring, with a toothed ring having teeth and with an outer sleeve.

In pipeline construction, in particular for domestic pipeline systems, that is to say for the indoor supply of hot and cold water for sanitary purposes and for the heating circuits, plastic pipelines are increasingly being used. Above all in heating systems with hot water lines laid in the floors, at least two couplings must be produced for each heatable room. Approximately 20 to 30 couplings are necessary for a normal one-family house. The couplings must be capable of being installed quickly, reliably and permanently.

DE 196 45 853 C1 discloses a generic quick-action coupling. A connection region of an adapter receives the end of a pipeline. The connection region of the adapter comprises, from the outside inward, a conically designed connection sleeve and a clamping cone which cooperates with the connection sleeve and which is held under spring tension in the axial direction by a spring. The clamping cone has, on the side facing the pipe, toothing elements which engage into the outer wall of the pipe. The pipeline end is introduced into the adapter. When a retaining clip which holds the spring under pretension is drawn away, the spring presses the clamping cone with a defined force into the likewise conically designed clamping sleeve, and the toothing elements engage into the pipe outer wall. This quick-action coupling is used as part of an adaptable pipeline installation system for medium-carrying pipelines for a wide pressure and temperature range. The quick-action coupling is composed essentially of metal parts.

DE 101 57 304.9 (not published prior to the present specification) describes a quick-action coupling for pipes, which comprises an adapter with a coupling region and with a connection region, the coupling region being designed for coupling to a pipe connection part suitable for it, and the connection region being designed for connection to a free end of a pipeline. Arranged in the connection region, around the end of the pipeline, are a part-circular toothed ring, a part-circular clamping cone and a circular connection sleeve. The adapter has, in the connection region, at least two latching fingers arranged on a circle and extending in the axial direction, in each case with latching steps projecting in the radial direction, and a driver ring for driving the connection sleeve is arranged in the connection region so as to be axially displaceable with respect to the latching fingers and so as to be radially latchable with respect to the latching steps.

DE 102 12 735.2 (not published prior to the present specification) describes a quick-action coupling for pipes, which comprises a tubular inner part, a clamping ring and a toothed ring having part-circular teeth. The quick-action coupling has an outer sleeve and an inner sleeve which consists of at least two parts.

The object of the invention is to provide a quick-action coupling which is constructed from as few individual parts as possible, which is compatible with the pipeline system and which can be produced cost-effectively both in terms of production and in terms of assembly on the construction site. The quick-action coupling is to ensure an absolutely secure and reliable connection, even without the aid of installation tools.

SUMMARY OF THE INVENTION

The foregoing object is achieved by a quick-action coupling for pipes, comprising a tubular inner part, an inner sleeve, a clamping ring, a toothed ring having teeth and an outer sleeve, wherein the outer sleeve has a cylindrical region with at least two different inside diameters and a clamping region designed conically on an inside surface.

The quick-action coupling is constructed from as few individual parts as possible. The assembly of the quick-action coupling together with the pipeline system on the construction site involves as few steps as possible.

To achieve a simple handing of the coupling, advantageously the inner sleeve is composed of two virtually identical halves.

Handling is further simplified by the formation of holding fingers on the inner sleeve for firmly holding the toothed ring before assembly on the construction site.

Preferably, the parts of the quick-action coupling are produced essentially from plastic, advantageously the outer sleeve and/or the inner sleeve being transparent.

For safety reasons, that is to say for checking the correct connection of the coupling to the pipeline, the outer sleeve and/or the inner sleeve are/is produced from a transparent plastic. Inspection windows arranged at a suitable point may likewise be envisaged.

BRIEF DESCRIPTION OF THE DRAWINGS

Further features according to the invention are listed in the remaining subclaims. In support of the claims, reference is made to the description of the Figures.

One possible exemplary embodiment of the invention is illustrated in the drawing in which:

FIGS. 17 to 19 show further examples of the application of the quick-action coupling.

DETAILED DESCRIPTION

Figure 1:
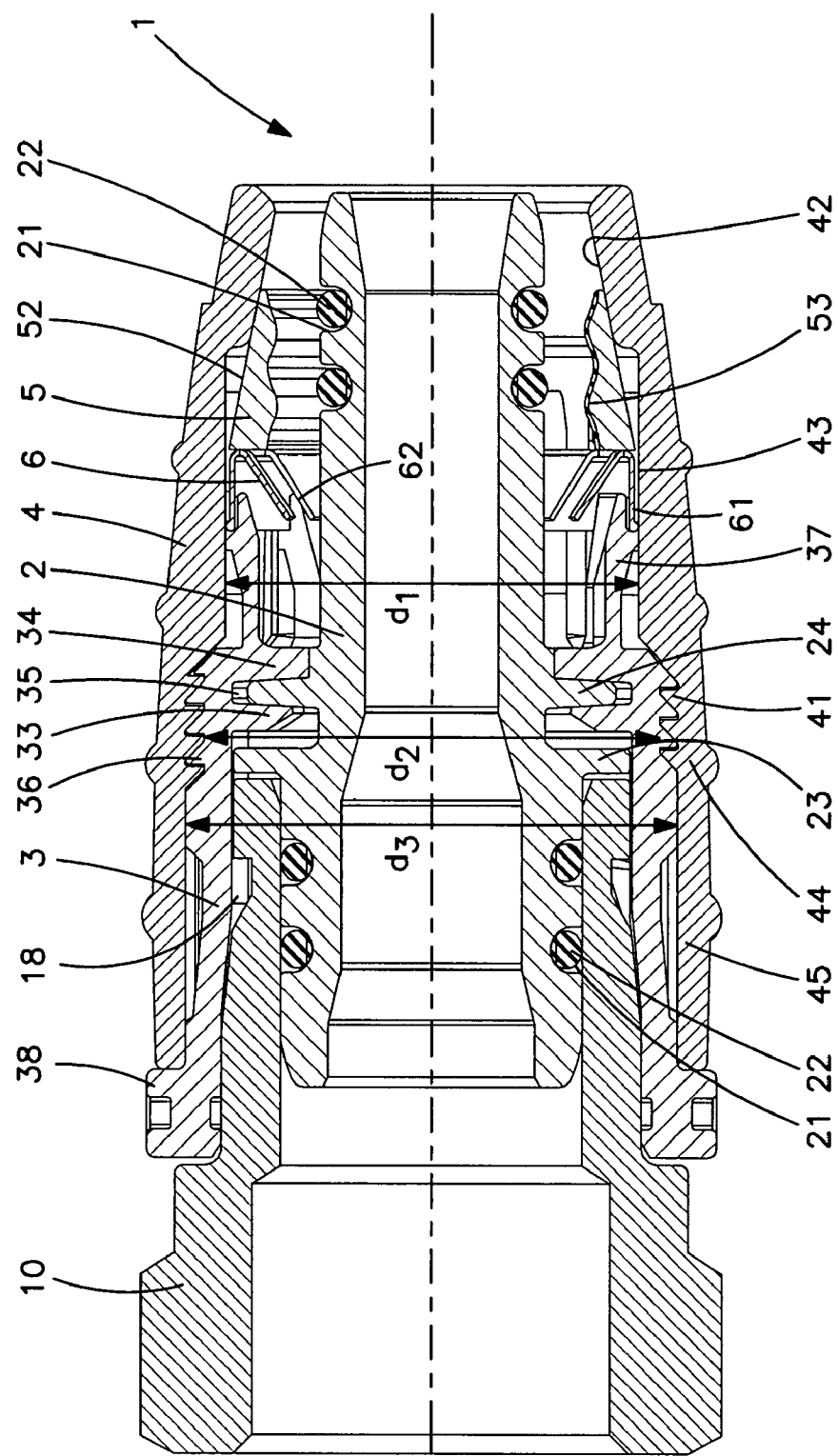
FIG. 1 shows a sectional view of the quick-action coupling without a pipeline to be connected.
Figure 2:
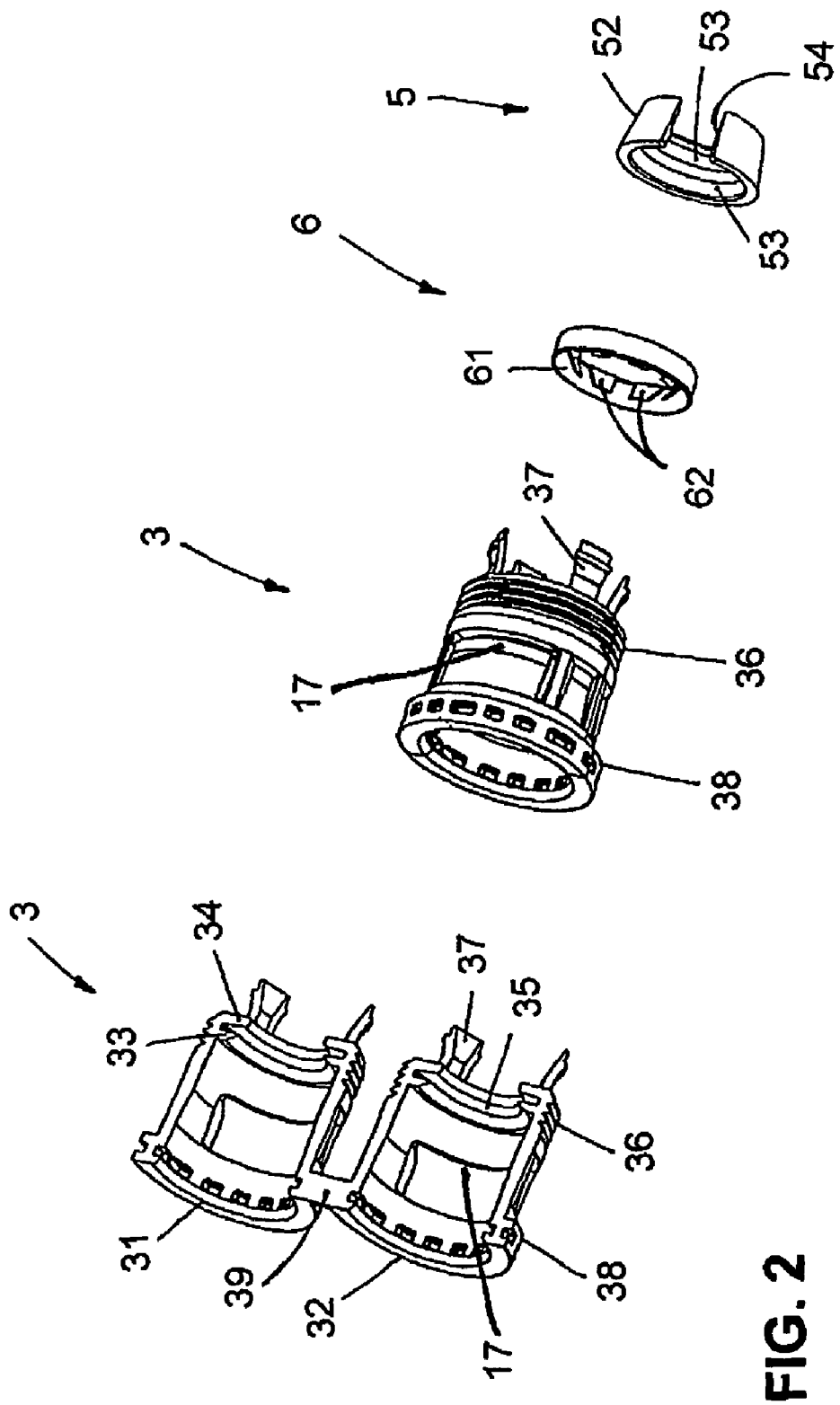
FIG. 2 shows a three-dimensional view of the inner sleeve, of the toothed ring and of the clamping ring.
Figure 3:
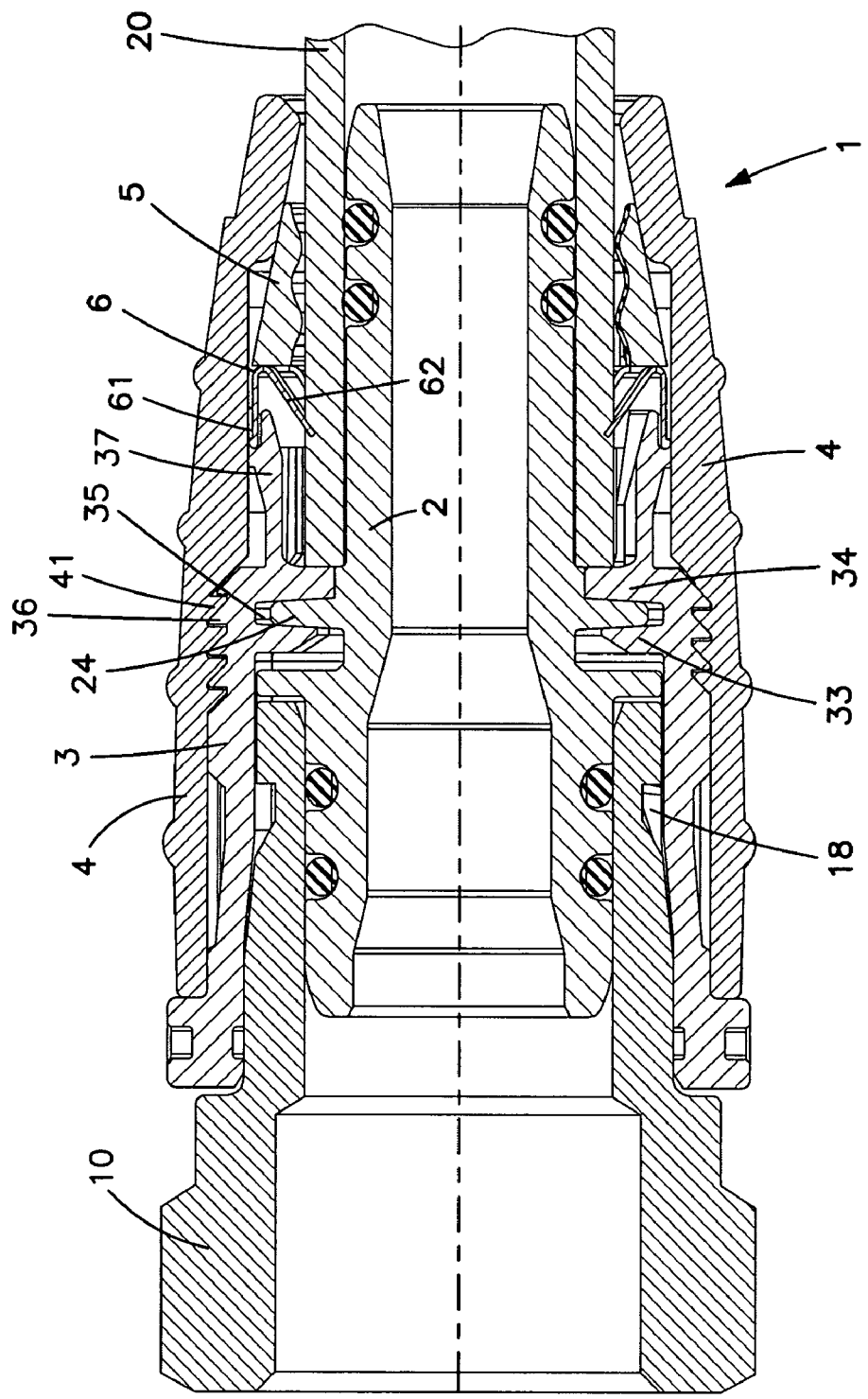
FIG. 3 shows a sectional view of the quick-action coupling with pipeline in the installed state before the first commissioning of the pipeline.

FIG. 1 shows a sectional view of the quick-action coupling 1 for connection to a pipeline which can be seen in FIGS. 2 and 3. The quick-action coupling 1 consists of a nipple-shaped, essentially cylindrically designed inner part 2, of an inner sleeve 3, of an outer sleeve 4, of a clamping ring 5 and of a toothed ring 6. With the exception of the toothed ring 6 made from metal, all the parts of the quick-action coupling 1 can be produced from plastic material in an injection molding method. The quick-action coupling 1 serves for making a connection between a pipeline, not illustrated here, and a pipe connection part 10. The pipeline can be pushed on, as on a nipple, and connected on the right side of the inner part 2, and the pipe connection part 10 is illustrated as being pushed on, as on a nipple, on the opposite, left side of the inner part 2.

On the outside of the cylindrical inner part 2 are formed grooves 21 in which O-ring seals 22 are arranged. This ensures that the medium in the pipeline system is sealed off outwardly. Two different projections 23, 24 are formed on the outer circumference of the inner part 2 approximately in the middle between the two nipple-shaped regions having the grooves 21 and the O-ring seals 22. A first projection 23 serves as a stop for the pipe connection part 10 and a second projection 24 serves for receiving the inner sleeve 3.

The inner sleeve 3 is constructed from at least two part-circular parts, for example from two half shells 31, 32. The half shells 31, 32 of the inner sleeve 3 are produced in a mold on a plastic injection molding plant, can be connected to one another by means of a small web 39 and are produced in pairs. The inner sleeve 3 may also be produced from a plurality of part-circular shell parts 31, 32. Further projections 33, 34 are formed on the inside of the inner sleeve 3. A groove 35 having a defined geometry is formed between the first projection 33 and the second projection 34. The geometry of this groove 35 coincides exactly with the geometry of the second projection 24 of the inner part 2. During the premounting of the quick-action coupling 1, the shell parts 31, 32 are laid on the inner part 2 and folded shut. In this case, the groove 35 is filled exactly with the second projection 24 of the inner part 2. The coincidental geometries of the groove 35 and of the projection 24 rule out a faulty premounting.

The inner sleeve 3 has on the outside, in the region of the projections 33, 34, an external thread 36 which cooperates with an internal thread 41 formed on the inside of the outer sleeve 4. A plurality of fingers 37 are formed on the inner sleeve 3 on the right side of the latter, that is to say on the pipeline side. At the free ends of the fingers 37, the radially outward-pointing surfaces of the fingers 37 are designed in such a way that, at least during premounting, the toothed ring 6 is carried by these finger outer surfaces. The fingers 37 are relatively slender and are integrally formed resiliently on the inner sleeve 3. The fingers 37 may also be formed by a plurality of slots in the wall of the inner sleeve 3. Owing to the pretension of the resilient fingers 37, during premounting the toothed ring 6 cannot come loose from the inner sleeve 3 and cannot easily be lost. If the toothed ring 6 made from metal is designed continuously over 360° on the outer circumference, the shell parts 31, 32 are also partially held together after being folded shut around the inner part 2. The premounting of the quick-action coupling 1 is thereby further simplified.

On the pipeline side, the clamping ring 5 is arranged, following the toothed ring 6, within the outer sleeve 4. The outer sleeve 4 encloses the clamping ring 5, the toothed ring 6 and the inner sleeve 3 in succession. The outer sleeve 4 has one behind the other, as seen from the pipeline, four different regions with different tasks: a conical region with a conically designed inner surface 42 which cooperates with the likewise conically designed outer surface 52 of the clamping ring 5, a following first cylindrical region 43 with an inside diameter d1, for receiving the outer wall 61 of the toothed ring 6 and the fingers 37 of the inner sleeve 3, a wider cylindrical region 44 having the internal thread 41, with an inside diameter d2, and a final cylindrical region 45 with an inside diameter d3 for firmly holding the shell parts 31, 32 of the inner sleeve 3. The inner sleeve 3 has a rim region with a larger outside diameter than the rest of the outer sleeve. This rim region acts as a stop 38 for the outer sleeve 4 when the outer sleeve 4 is being screwed on.

The clamping ring 5 is designed conically on the outer surface area 52 and is adapted correspondingly to the conical inner surface 42 of the outer sleeve 4. Furthermore, the clamping ring 5 has at least one projection 53 in the inner region. The projections 53 serve for increasing the pressure which acts on the pipeline when the quick-action coupling 1 is in the state assembled together with the pipeline. The lateral surface area 52 of the conical clamping ring 5 is always, at least in regions, in contact with the conical inner surface 42 of the outer sleeve 4 at any time, that is to say both after premounting and in the ready-installed state. The inner sleeve 3 and/or the outer sleeve 4 are/is manufactured from transparent material, for example plastic.

The inner sleeve 3, the toothed ring 6 and the clamping ring 5 are illustrated three-dimensionally in FIG. 2. In order to make mounting easier, the inner sleeve 3 may be manufactured from two half shells 31 and 32, the half shells 31 and 32 being connected by means of a web 39. All the other reference symbols correspond to those of FIG. 1. The toothed ring 6 has, on the inner circumference, teeth 62 for the retention of the pipeline. The conical outer surface 52 and the projections 53 have already been described with reference to FIG. 1. The conical clamping ring 5 has a slot 54. The clamping ring 5 is pretensioned before the first introduction into the conical region of the outer sleeve 4. The pretensioning of the clamping ring 5 serves for holding the toothed ring 6 nondisplaceably on the fingers 37 of the inner sleeve 3.

The mounting of the quick-action coupling 1 takes place in that, in a first step, after the O-rings 22 have been placed into the grooves 21 of the inner part 2, the two halves 31 and 32 are applied to the inner part 2 with an appropriate fit, the projection 24 of the inner part 2 engaging into the groove 35 of the inner sleeve 3. The projection 24 fits exactly with the groove 35. The two halves 31 and 32 are manufactured in such a way that, in the closed folded-shut state, a closed external thread 36 is obtained which cooperates with the internal thread 41 of the outer sleeve 4. In a second step, the toothed ring 6 is pushed onto the fingers 37 of the folded-together inner sleeve 3 and is held firmly on the outer surfaces of the fingers 37.

In a third step, the clamping ring 5 is introduced under pretension into the outer sleeve 4. Finally, in a fourth step, the outer sleeve 4 is screwed onto the inner sleeve 3 as far as the stop 38. The quick-action coupling 1 is thus premounted for installation on the construction site. During the introduction of the pipe connection part 10, latching fingers 17, which are formed resiliently on the inner sleeve 3, latch into a groove 18 of the pipe connection part 10. The groove 18 can be seen in FIGS. 1, 3 and 4. The arrangement of the latching fingers 17 on the half shells of the inner sleeve 3 can best be seen in FIG. 2.

Figure 4:
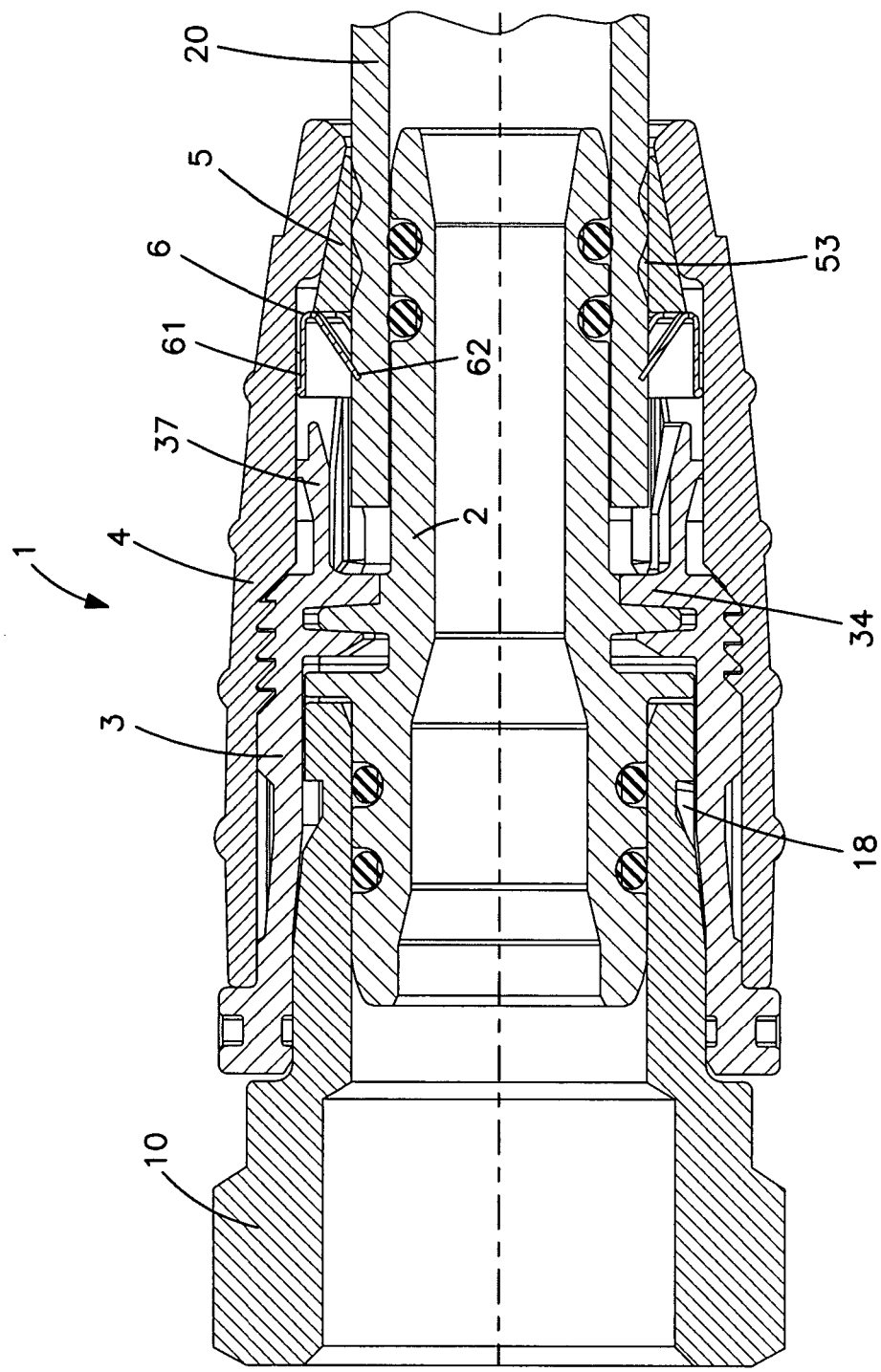
FIG. 4 shows a sectional view of the quick-action coupling with pipeline in the installed state after the pipeline has been subjected to pressure.

The functioning of the quick-action coupling 1 is illustrated in FIGS. 3 and 4. In the pressureless state, according to FIG. 3, a pipeline 20 is introduced into the quick-action coupling 1 as far as the second projection 34 of the inner sleeve 3. When the pipeline 20 is subjected to pressure, the situation according to FIG. 4 arises. The pipeline 20 is displaced somewhat away from the second projection 34 of the inner sleeve 3 and is held firmly by virtue of the teeth 62 arranged in the toothed ring 6 and by means of the projections 53 of the clamping ring 5, so that a secure connection is obtained.

Figure 5:
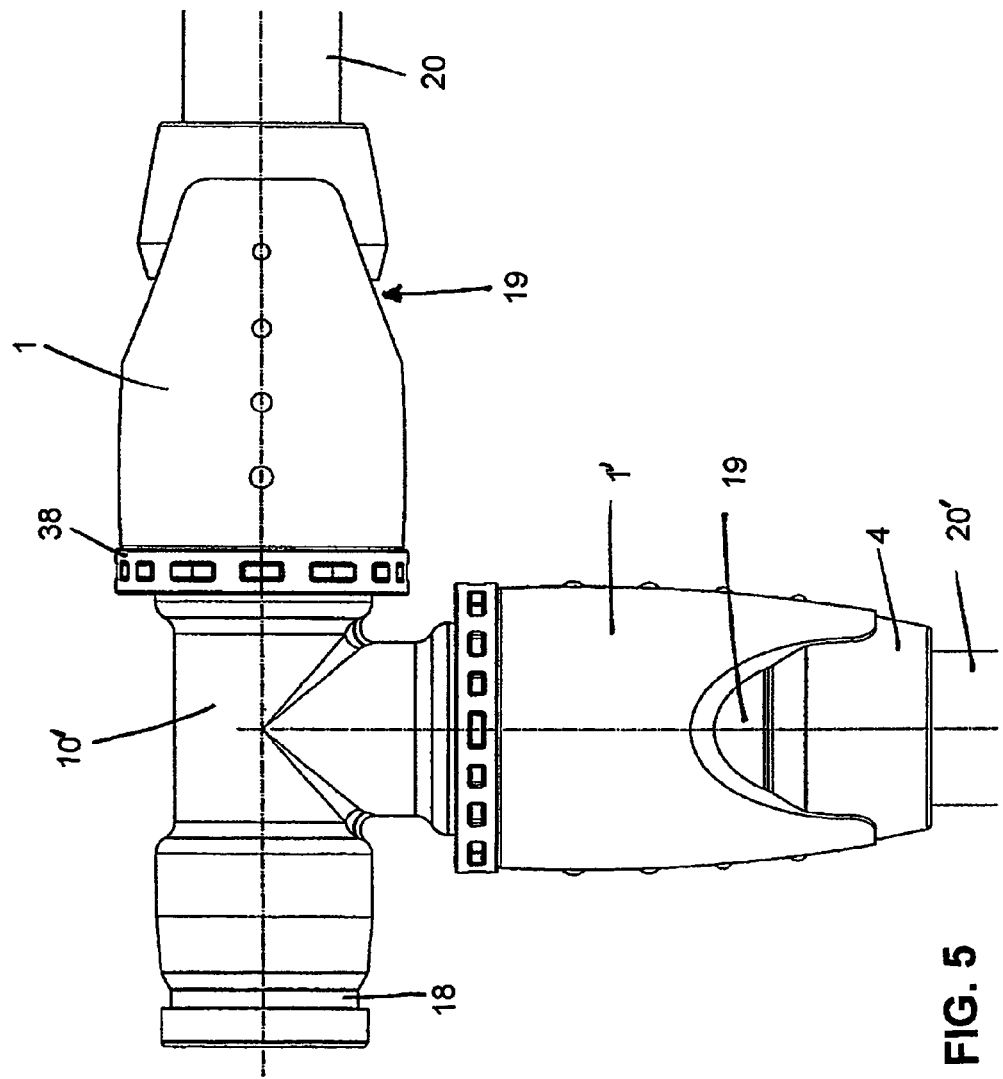
FIG. 5 shows a possible application of the quick-action coupling.

FIG. 5 shows an application of the quick-action coupling 1. In each case two quick-action couplings 1, 1' are connected to the ends of a pipe connection part 10' which is designed here, for example, as a T-fitting. To check for a secure connection, the quick-action couplings 1, 1' have inspection windows 19 or they consist of transparent material. During the connection of the coupling to the T-fitting 10', an acoustic signal in the form of a "click" is generated as a result of the latching of the latching fingers 17 into the groove 18.

FIGS. 6 to 10 show a second exemplary embodiment of the quick-action coupling.

Figure 6:
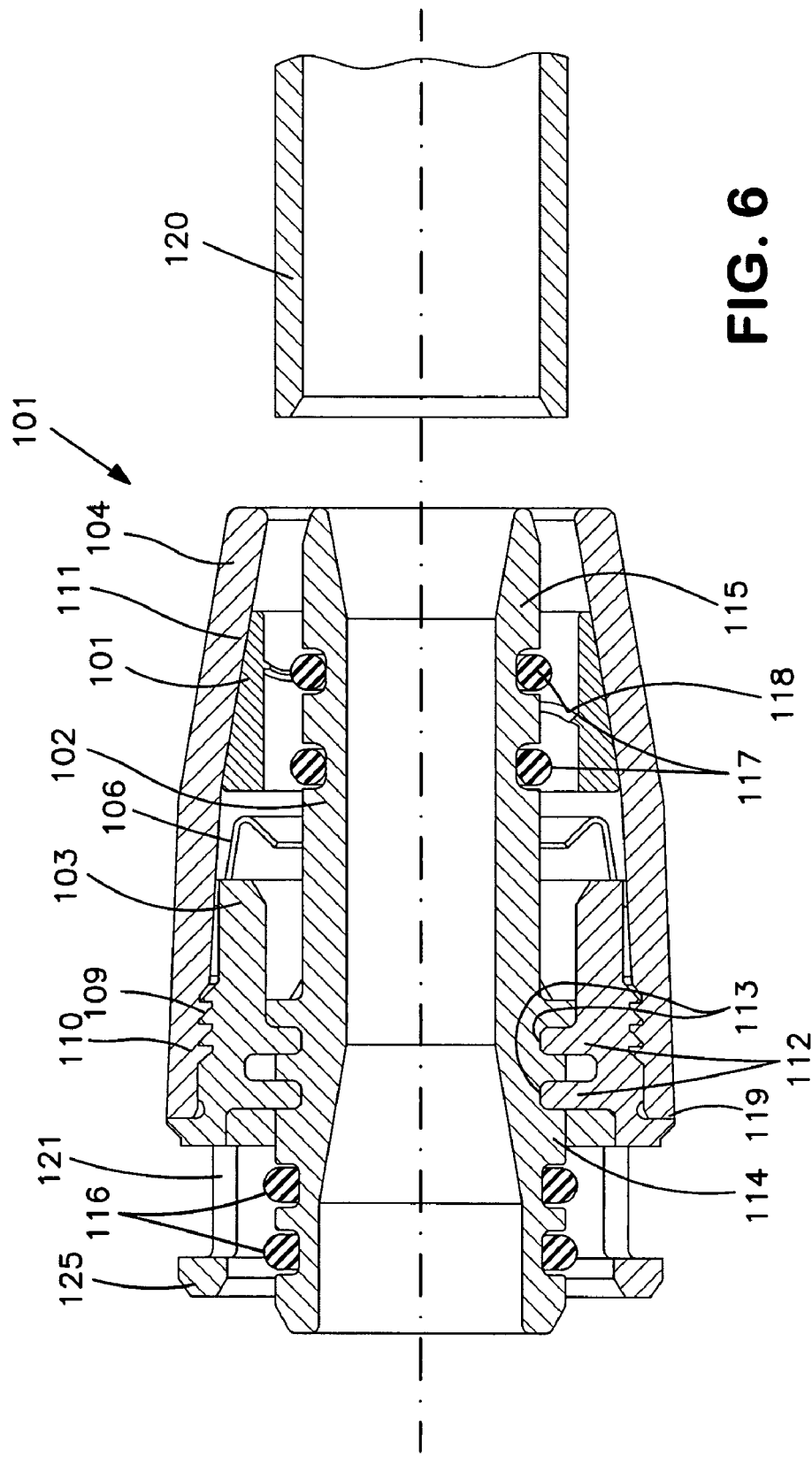
FIG. 6 shows a sectional view of the quick-action coupling in a second exemplary embodiment, with a pipeline not yet connected.
Figure 7:
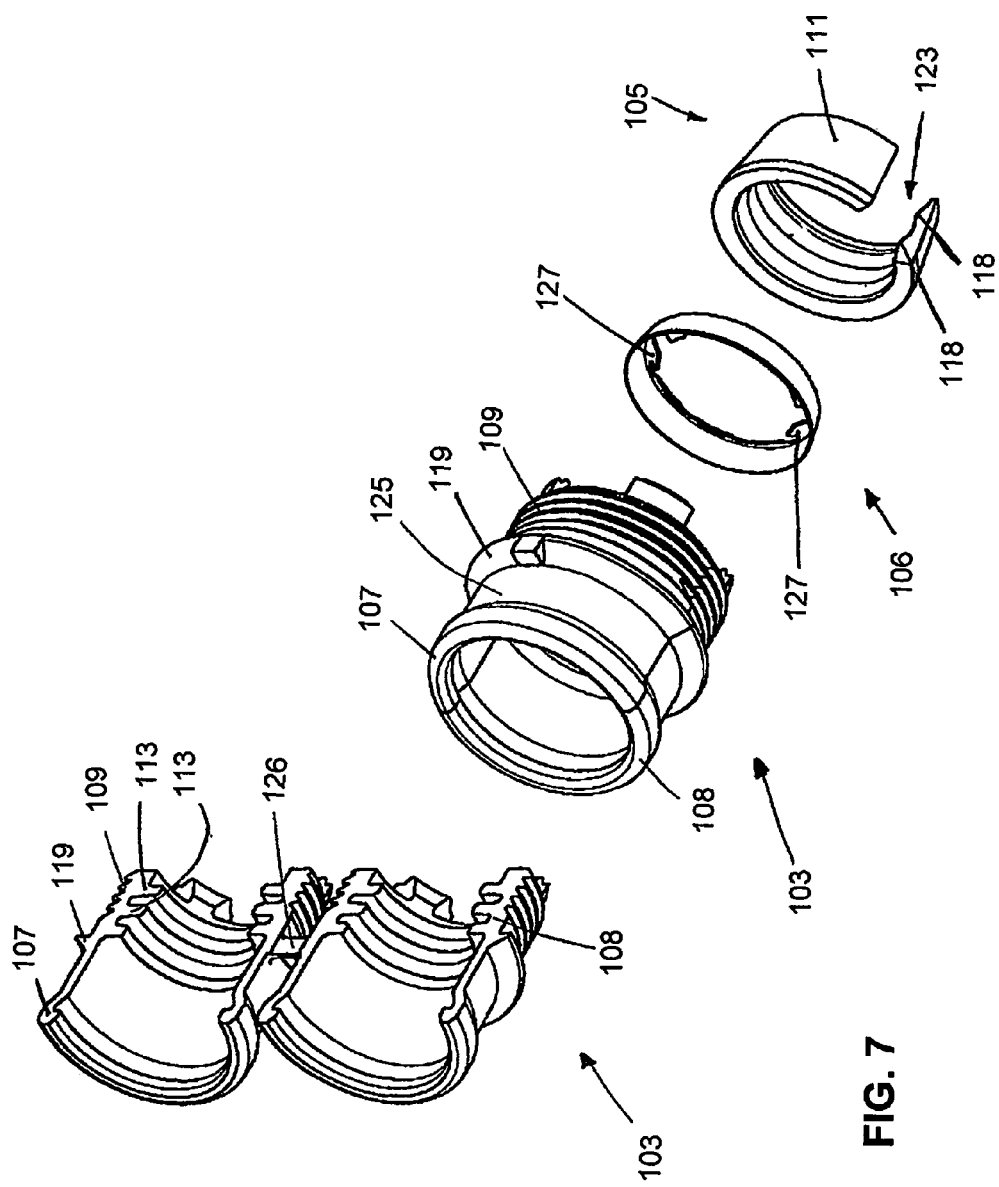
FIG. 7 shows a three-dimensional view of the inner sleeve with toothed ring and clamping ring from FIG. 6.

FIG. 6 shows a sectional view of the quick-action coupling 101 for connection to a pipeline 120 which can be seen still outside the quick-action coupling. The inner sleeve 103, onto which the outer sleeve 104 is screwed in turn, is arranged over a nipple-shaped inner part 102 which serves as a carrier for the pipeline 120. Inside the quick-action coupling 101, the inner sleeve 103 is followed, as seen in the direction of the pipeline 120, by the toothed ring 106 and the clamping ring 105. The inner sleeve 103 is constructed in two parts from two half shell halves 107 and 108, as is shown in FIG. 7 described in more detail below. The inner sleeve 103 has an external thread 109 which cooperates with the internal thread 110 arranged on the outer sleeve 104. The clamping ring 105 is designed conically on the lateral surface area 111 so as to be adapted correspondingly to the conical inner region of the outer sleeve.

Furthermore, the clamping ring 105 has at least one projection 118 in the inner region. The inner sleeve 103 has projections 112 which engage into the grooves 113 arranged in the inner part. The inner part 102 has at least two tubular regions 114 and 115 with different diameters. For sealing off, two O-rings 116 and 117 are attached in each case on the tubular regions 114 and 115 of the inner part. The stop 119 serves for limiting the travel of the outer sleeve 104. The inner part 103 has, at one end, a prolongation 125, into which clearances 121 are introduced in order to save material. The inner sleeve 103 and/or the outer sleeve 104 are/is manufactured from transparent material, for example plastic.

The inner sleeve 103, the toothed ring 106 and the clamping ring 105 are illustrated three-dimensionally in FIG. 7. In order to make mounting possible, the inner sleeve is manufactured from two half shells 107 and 108, the half shells 107 and 108 being connected by means of a web 126. All the other reference symbols correspond to those of FIG. 6. Moreover, this embodiment of the inner sleeve 103 has no clearances 121 on the prolongation 125.

The toothed ring 106 has, on the inner circumference, teeth 127 for retention of the pipeline 120.

The clamping ring 105 has an interruption 123. The conical region 111 and the projection 118 have already been described with regard to FIG. 6.

The mounting of the quick-action coupling takes place in that, in a first step, after the O-rings 116 and 117 have been put in place, the two halves 107 and 108 are applied to the inner part 102 with an appropriate fit, the projections 112 of the inner sleeve 103 engaging into the grooves 113 of the inner part. The two halves 107 and 108 are manufactured in such a way that, in the closed state, a closed external thread 109 is obtained which cooperates with the internal thread 110 of the outer sleeve.

In the second step, the clamping ring 105 and the toothed ring 106 are introduced into the outer sleeve 104.

Finally, in the third step, the outer sleeve 104 is screwed onto the inner sleeve 103 as far the stop 119.

The quick-action coupling 101 is thus mounted for installation.

Figure 8:
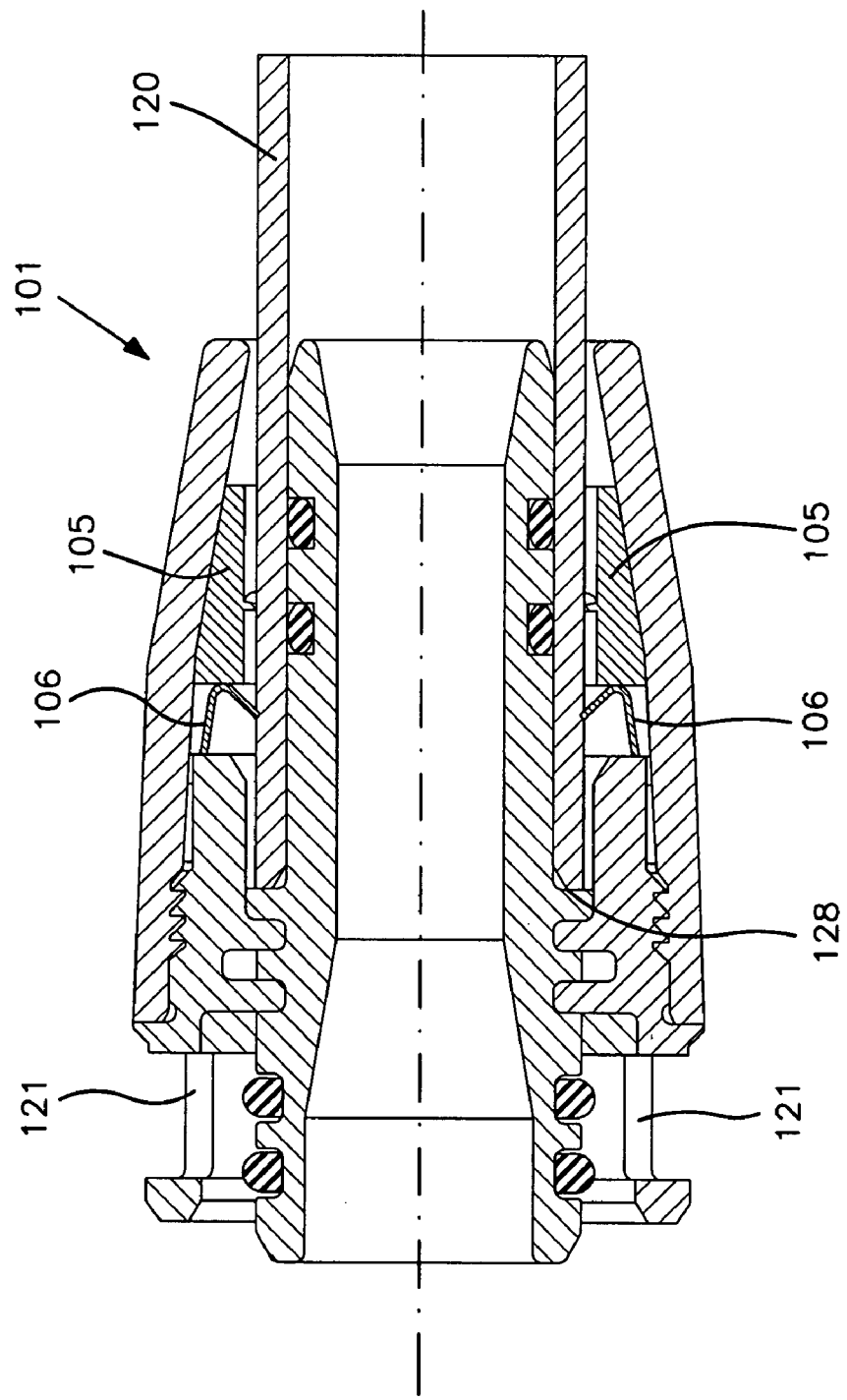
FIG. 8 shows a sectional view of the quick-action coupling with pipeline in an intermediate phase.
Figure 9:
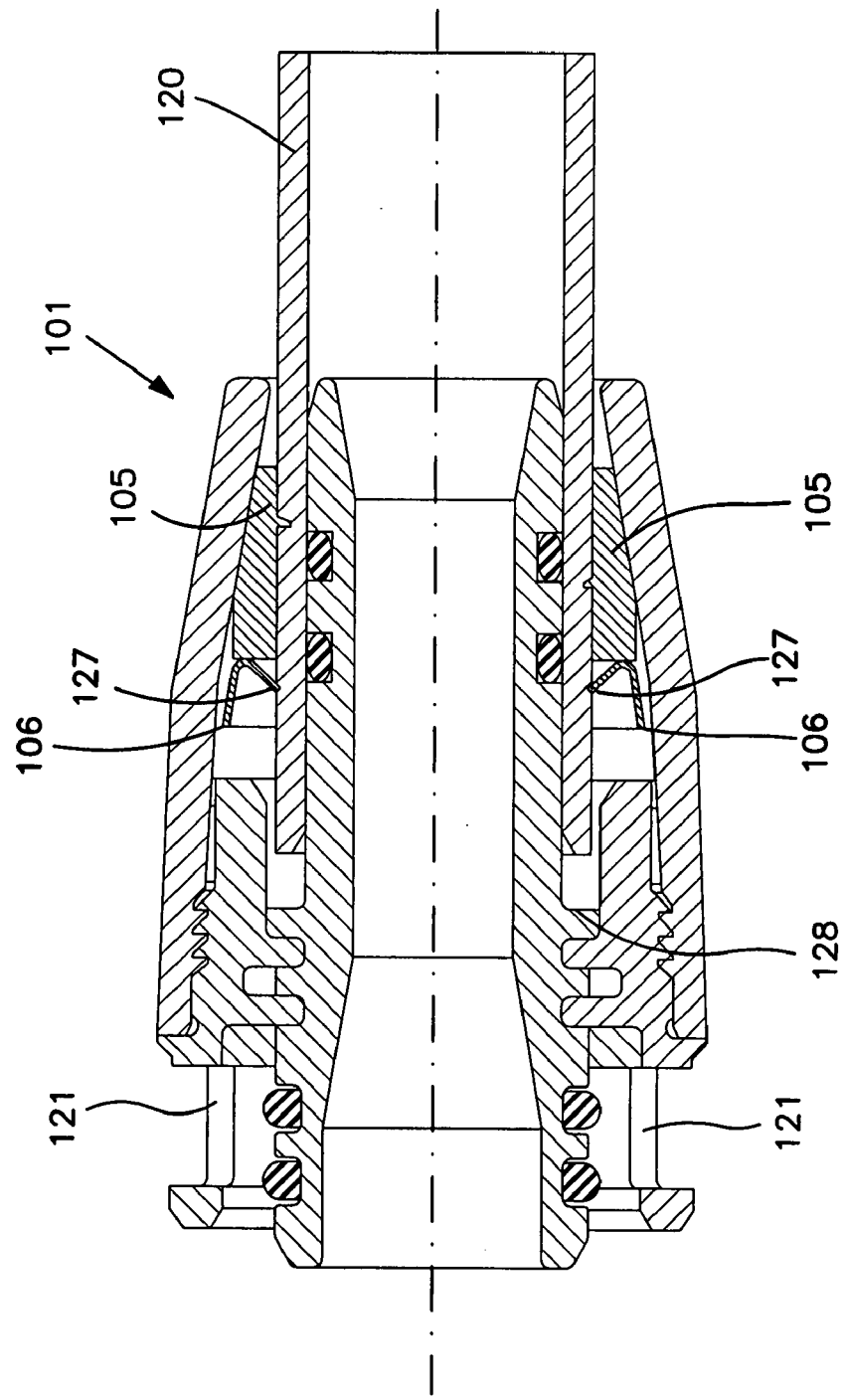
FIG. 9 shows a sectional view of the quick-action coupling with pipeline in the final installed state.

The function of the quick-action coupling 101 is illustrated in FIGS. 8 and 9. In the pressureless state, according to FIG. 8, the pipeline 120 is introduced into the quick-action coupling 101 as far as the inner stop 128. When the pipeline 120 is subjected to pressure, the situation according to FIG. 9 arises. The pipeline 120 is displaced somewhat away from the stop 128 and is held firmly by virtue of the teeth 127 arranged in the toothed ring 106 and by means of the clamping ring 105, so that a secure connection is obtained.

Figure 10:
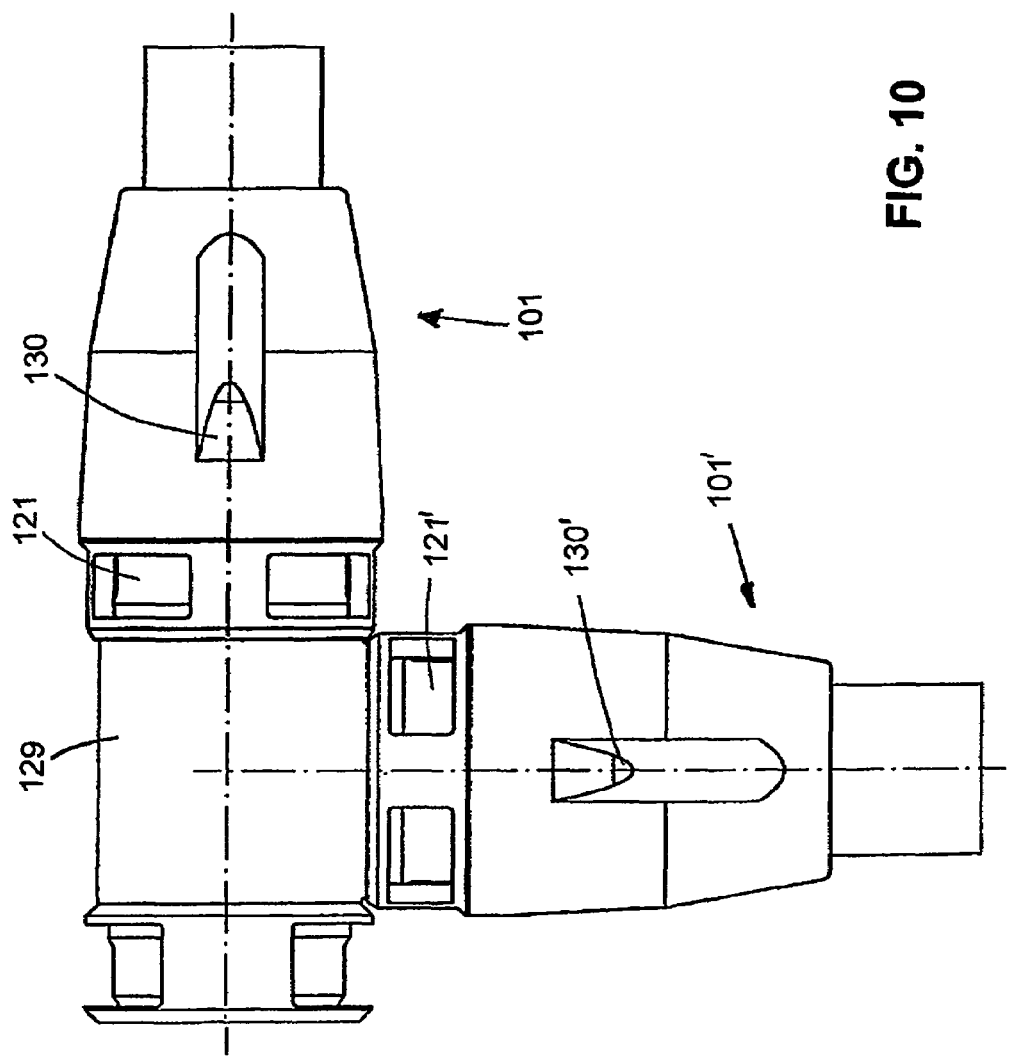
FIG. 10 shows a further possible application of the quick-action coupling.

FIG. 10 shows an application of the quick-action coupling 101. In each case two quick-action couplings 101, 101' are connected to the ends of a fitting 129. To check for a secure connection, the quick-action couplings 101, 101' have inspection windows 130, 130' or they consist of a transparent material. During the connection of the coupling to the fitting, an acoustic signal in the form of a "click" is generated.

A further exemplary embodiment of the quick-action coupling is shown in FIGS. 11 to 19.

Figure 11:
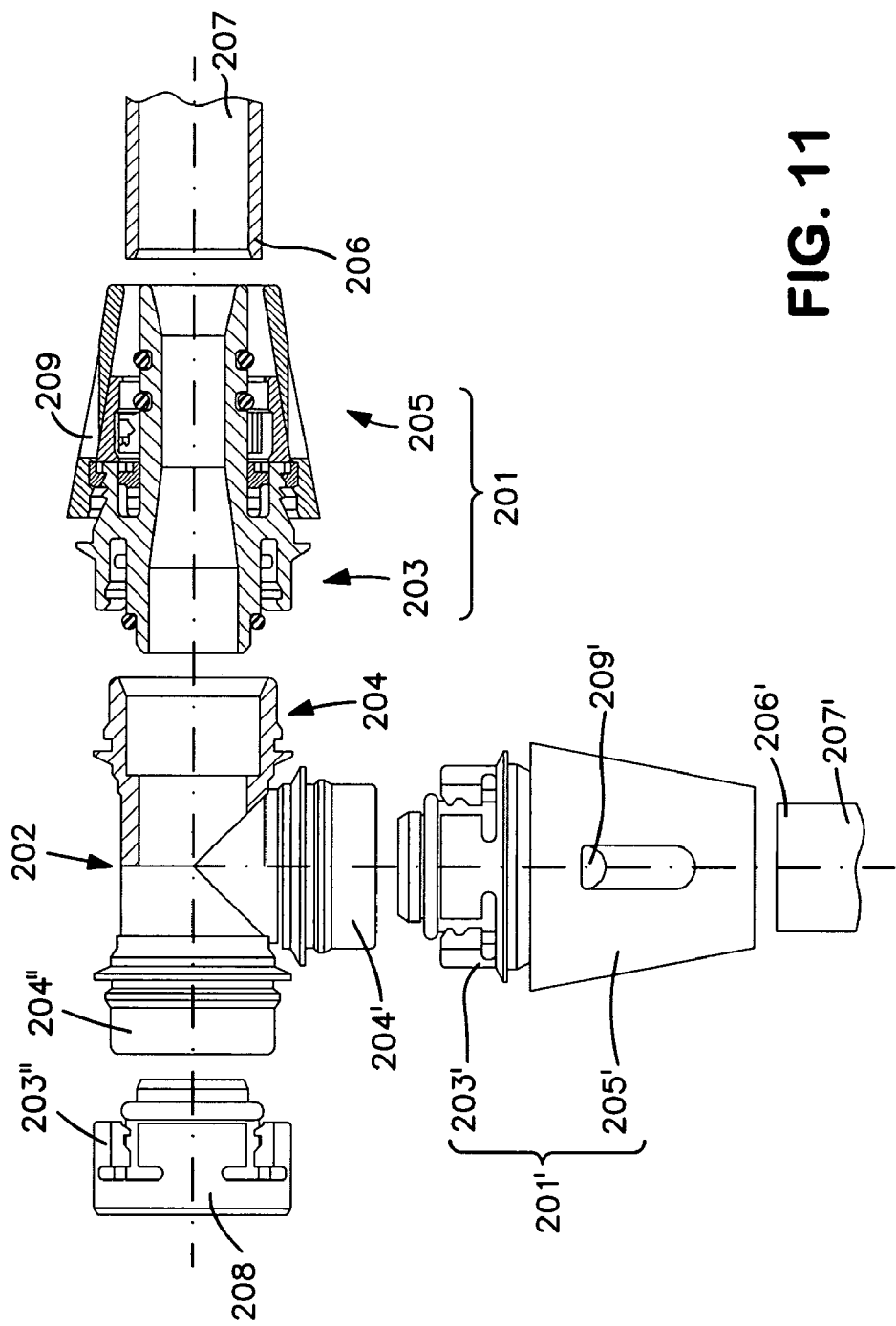
FIG. 11 shows a partially sectional view of a detail of a pipeline system with two quick-action couplings according to the invention.

FIG. 11 illustrates a detail of a pipeline system with two quick-action couplings. The quick-action coupling is constructed from an adapter 201, 201' and a pipe connection part 202. The adapter 201, 201' consists of a coupling region 203, which is designed complementarily to a coupling reception region 204 of the pipe connection part 202, and of a connection region 205. By the adapter 201, 201' and the pipe connection part 202 being designed complementarily, a pipeline connection can be made simply and quickly. The connection region 205 of the adapter 201 serves for connection to one end 206 of a pipeline 207 and is described in more detail particularly with reference to FIGS. 13 to 16. The pipeline system of FIG. 11 comprises a T-shaped pipe connection part 202 with the possibility of connecting the ends 206 of three pipelines 207. The pipelines 207 may be produced from plastic, from composite metal/plastic materials or from light metal materials.

In FIG. 11, two pipeline ends 206 are illustrated as being connectable to two coupling reception regions 204, 204' arranged at an angle of 90° to one another. A blind plug 208, not a pipeline, is illustrated as being connectable to the third coupling reception region 204". The exemplary embodiment of FIG. 11 shows that, by means of the combination of a T-shaped pipe connection part 202 and of a blind plug 208, different arrangements of pipeline ends 206 can be connected to one another. It is also conceivable that the coupling reception regions 204, 204', 204" have different line inside diameters, so that even pipelines with a different diameter can be connected to one another. On account of this high adaptability to different operating conditions, the pipe connection part 202 is therefore also designated as a module 202. The blind plug 208 has a coupling region 203" which is designed identically to the coupling region 203, 203' of the adapter 201, 201'.

Figure 12:
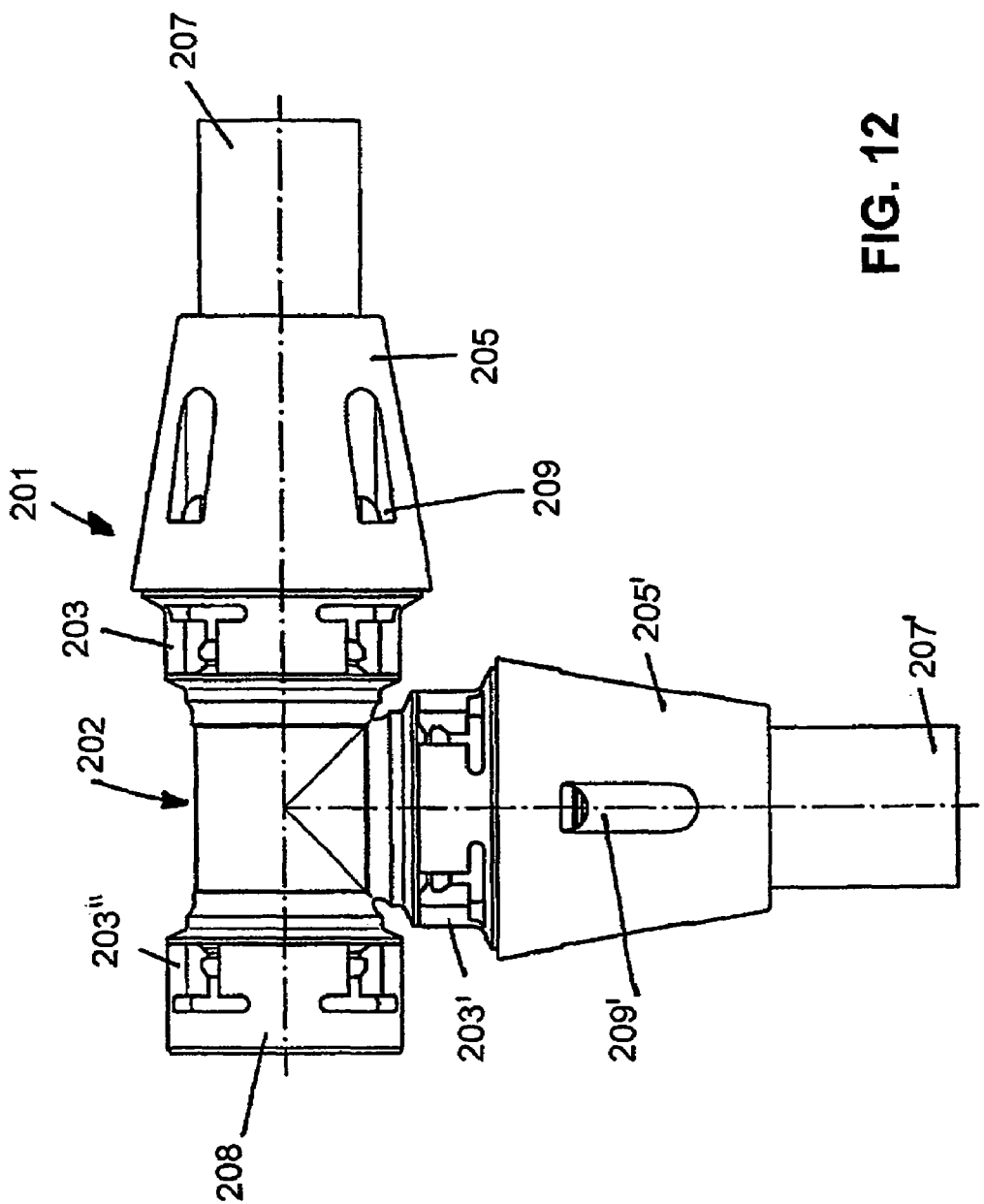
FIG. 12 shows a view of the detail of the pipeline system of FIG. 11 in the assembled state.

FIG. 12 illustrates the detail of the pipeline system of FIG. 11 once again, but in the assembled state here. The inspection windows 209, 209' are illustrated in the connection regions 205, 205'. It can be observed through these inspection windows 209, 209' that the operation of connecting the adapter 201 to the pipe 207 is concluded completely and that a secure connection has been made.

The operation of connecting the pipeline end 206 to the adapter 201 is described in the individual phases of the operation with reference to the sections of FIGS. 13 to 16.

Figure 13:
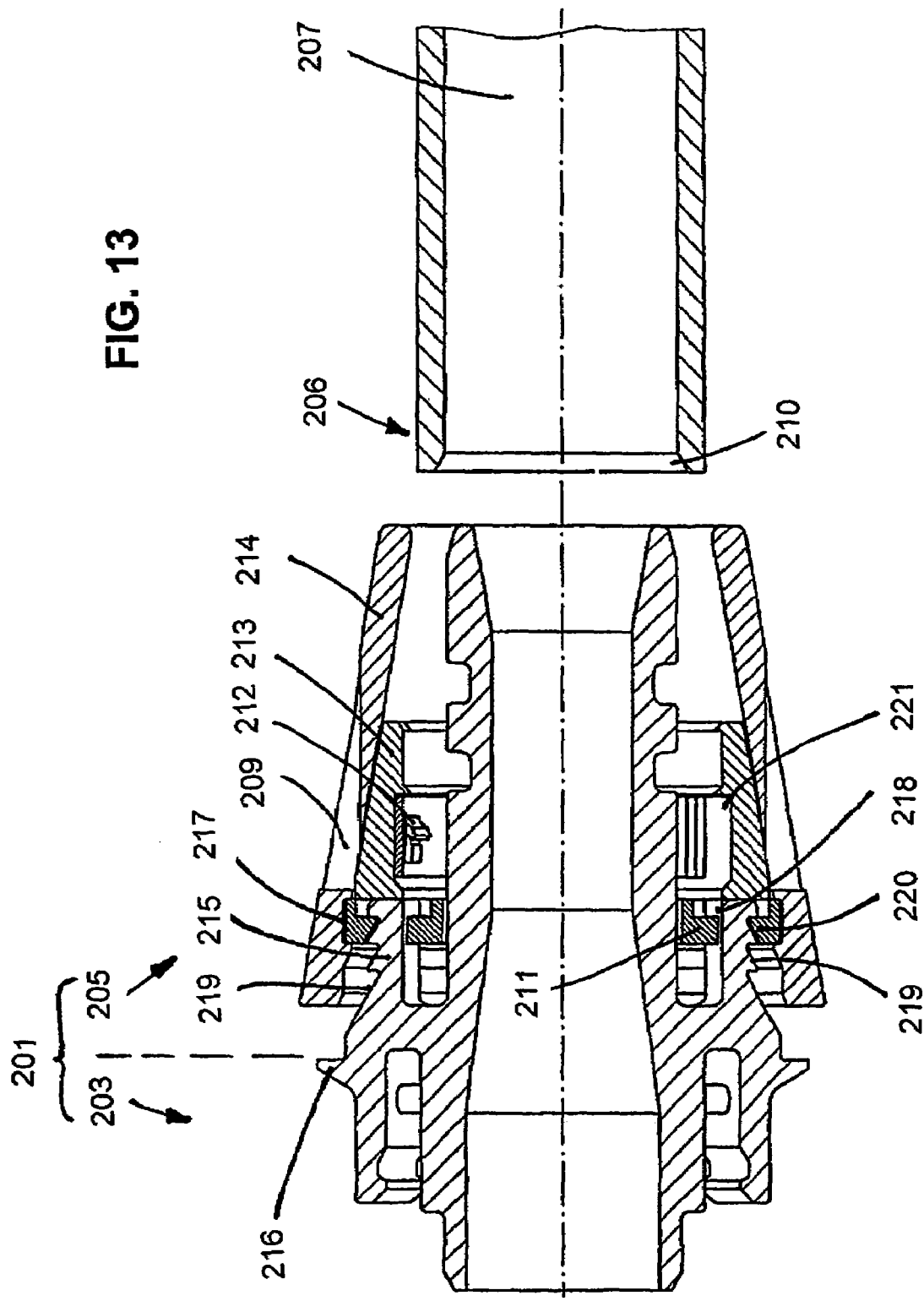
FIG. 13 shows a section through an adapter of the quick-action couplings of FIGS. 11 and 12 before assembly.

FIG. 13 illustrates the end 206 of a pipeline 207 and an adapter 201. The adapter 201 is illustrated as it is delivered on the construction site. The adapter 201 consists of the connection region 205 and, adjoining the latter in the axial direction, of the coupling region 203 and is produced essentially from plastic materials, for example in an injection molding method. The end 206 of the pipeline 207 made from plastic is calibrated internally before assembly, that is to say is set to the correct inside diameter, and is chamfered from the end, on the inside, to form a chamfer 210. As seen from the inside outward, the following individual parts are evident in the connection region 205 of the adapter 201: a driver ring 211, a toothed ring 212, a clamping cone 213 and a connecting sleeve 214.

At least two latching fingers 215 are formed in the connection region 205 of the adapter 201. At the boundary between the connection region 205 and the coupling region 203 is formed a stop 216 which serves for limiting the axial movement of the connecting sleeve 214 with respect to the connection region 205 of the adapter 201. The stop 216 is designed as an all-round continuous annular projection on the outer circumference of the adapter 201. The driver ring 211 is arranged so as to fit into a groove 217 on the inside of the connecting sleeve 214.

The fit between the connecting sleeve 214 and the driver ring 211 is so accurate that, in the event of the axial movement of the driver ring 211, the connecting sleeve 214 also executes the same axial movement. Both the driver ring 211 and the connecting sleeve 214 are designed continuously over the full circle circumference, at least in the region of the groove 217, and form a stable and load-bearing combination. During the assembly of the adapter 201 together with the pipeline end 206, this combination serves for transmitting the forces which have to be applied for assembly purposes.

The driver ring 211 is designed in the manner of an annular disk 211. Part-circular and axially continuous orifices 218 are cut out in the annular disk 211. An orifice 218 is provided in each case for each latching finger 215. The latching fingers 215 are arranged on a circle at a distance from the inner wall of the connection region 205. Two, three or more latching fingers 215, which all extend in the axial direction of the adapter 201, may be formed. The latching fingers 215 have a plurality of latching steps 219 which are formed on the latching fingers 215 so as to project in the radial direction. The driver ring 211 has a latching nose 220 in each of the orifices 218, said latching noses being formed so as to project inward in the radial direction and cooperating with the latching steps 219 of the latching fingers 215.

The toothed ring 212 and the clamping cone 213 are designed part-circularly, that is to say not all-round continuously. The toothed ring 212 and the clamping cone 213 are produced so as to be open on part of their circumference, so that, when a force acts on the toothed ring 212 and on the clamping cone 213 in the radial direction, these can vary in diameter, that is to say narrow. The toothed ring 212 is fitted into a depression 221 on the inside of the clamping cone 213. The toothed ring 212 and the clamping cone 213 thus also form a stable unit. When pressure is exerted on the clamping cone 213 from the outside inward, the diameter of the toothed ring 212 will be reduced. The toothed ring 212 is produced from a metal band by stamping, cutting and bending and has a profile which accords exactly with the tasks of the toothed ring. Like all the other components of the quick-action coupling, the clamping cone 213 is produced from plastic in an injection molding method.

In the delivery state, the clamping cone 213 is located inside the connecting sleeve 214 on a circle having the largest possible diameter. The driver ring 211, which drives the connecting sleeve 214 in the axial direction, is in latch engagement by means of the latching nose 220 with that of the latching steps 219 which is furthest away from the coupling region 203, as seen in the axial direction. The end face of the driver ring 211 is at the same height as or is somewhat higher than the end face of the latching fingers 215. The clamping cone 213 lies on the end face of the driver ring 211. O-ring seals, which may be arranged in further peripheral grooves for sealing off the medium outwardly, are omitted in FIG. 13.

Figure 14:
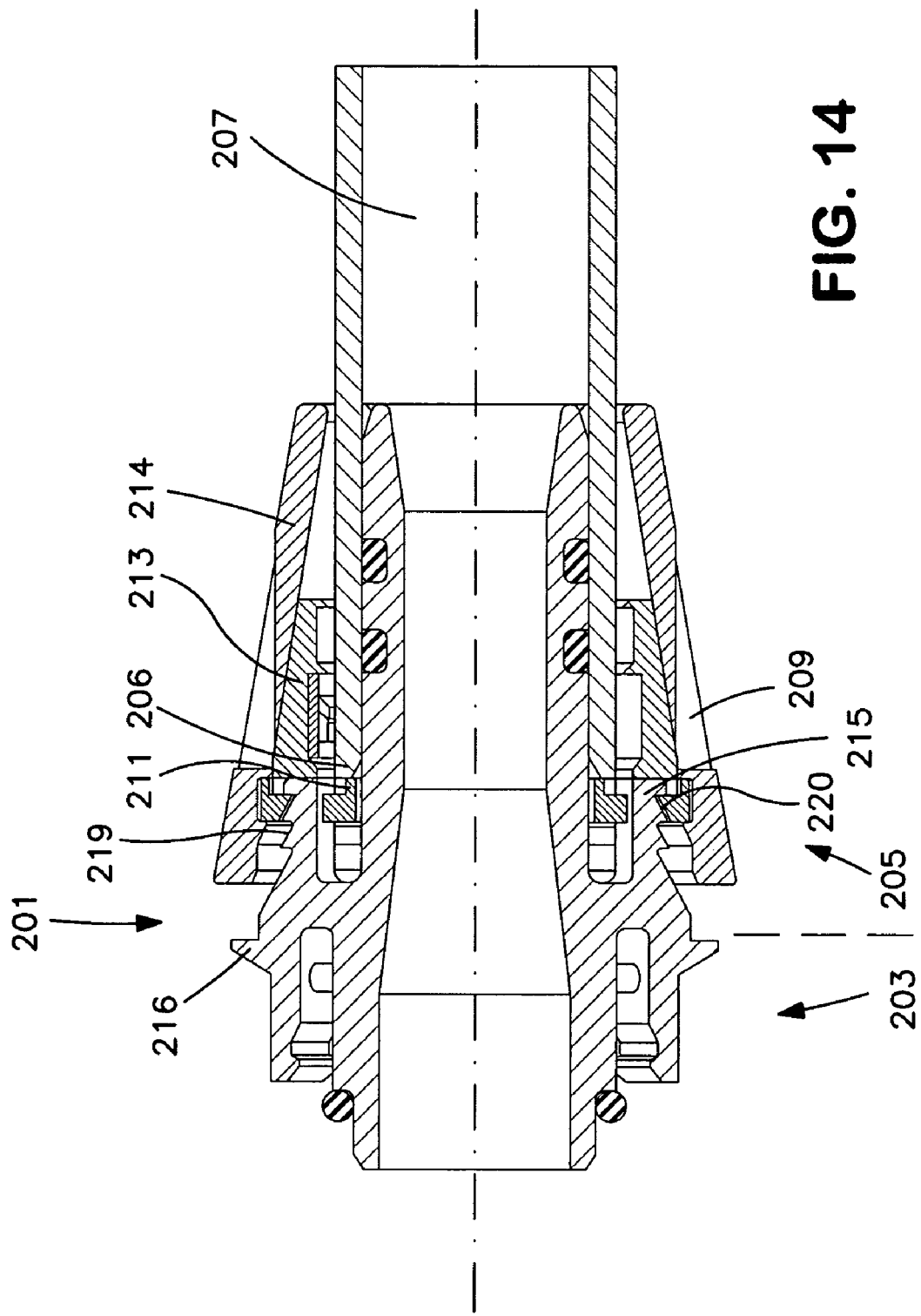
FIG. 14 shows a section through the adapter of FIG. 13 in a first phase of assembly.

In FIG. 14, in comparison with FIG. 13, the adapter 201 has just been placed with the connection region 205 onto the end 206 of the pipeline 207. On the construction site, the installer will pick up with one hand the free end 206 of the already laid flexible plastic pipeline 207 and bend it away from the wall or from the floor as far as necessary for working and with the other hand slip the adapter 201 onto the pipeline end 206. In the state illustrated in FIG. 14, pressure has still not been exerted on the end 206 or on the adapter 201. The end 206 of the pipeline 207 just touches the driver ring 211 and the clamping cone 213 has not yet been moved axially. In the state shown in FIG. 14, as in the state shown in FIG. 13, the clamping cone 213 can still be seen in the inspection window 209. It can thus be observed through the inspection window 209 that the clamping cone 213 has not yet moved with respect to the connecting sleeve 214.

Figure 15:
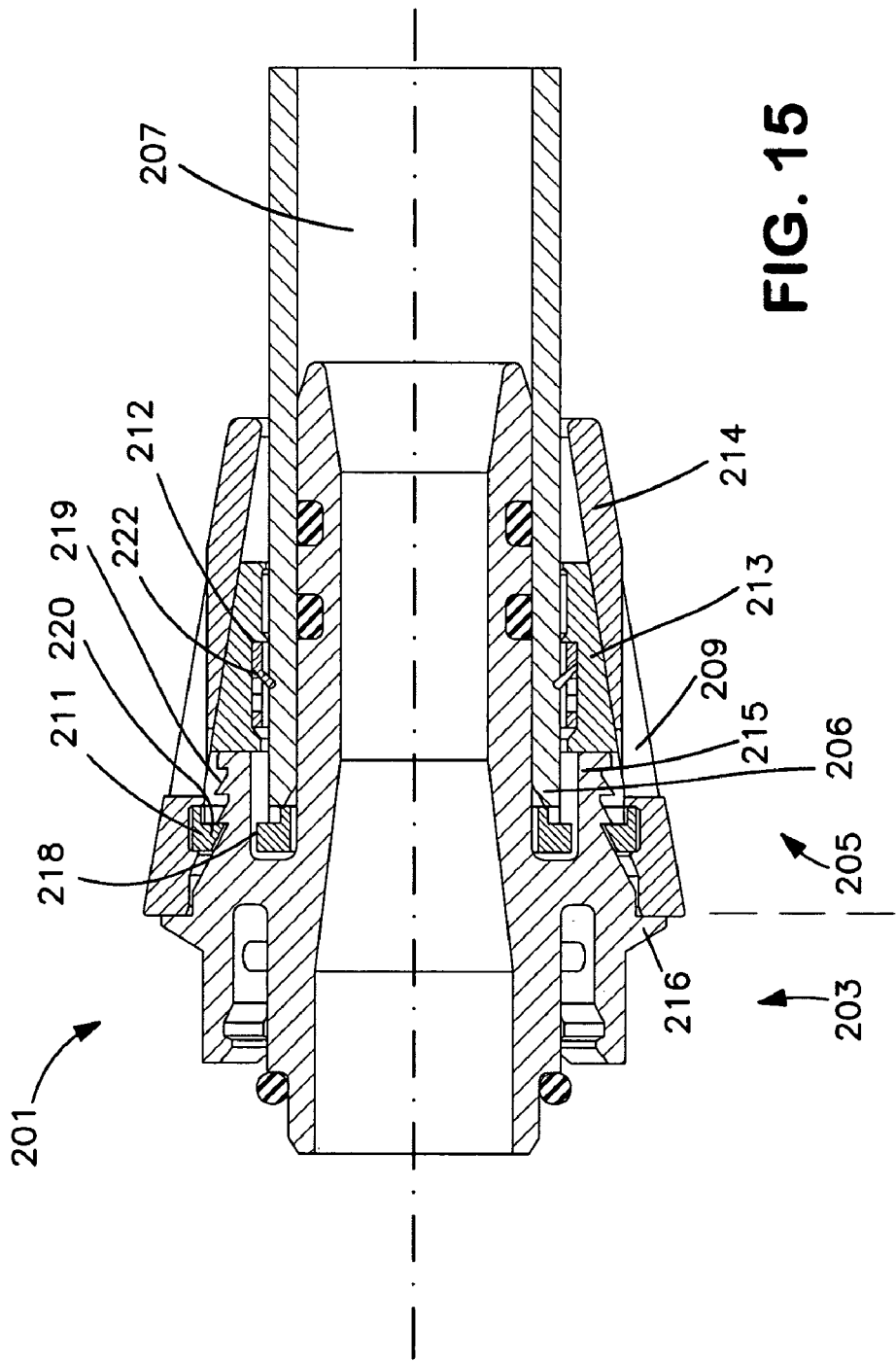
FIG. 15 shows a section through the adapter of FIG. 14 in a final phase of assembly.

FIG. 15 illustrates the adapter 201 once again, but after being slipped onto the pipeline 207 and after pressing together. The adapter 201 together with the latching fingers 215 in the connection region 205 has been pushed as far as possible through the orifice 218. The latching nose 220 of the driver ring 211 in this case jumps over the latching steps 219 of the latching fingers 215. The jump over the latching steps is detected by the installer as a signal perceptible audibly and by feel. Since the end 206 of the pipeline 207 lay on the driver ring 211 before the pushing movement, as a consequence of the pushing movement the clamping cone 213 is moved in the axial direction with respect to the connecting sleeve 214 and with respect to the pipeline 207. Between the state shown in FIG. 14 and the state shown in FIG. 15, the pipeline 207 does not move with respect to the connecting sleeve 214. Only the adapter 201 together with the latching fingers 215 and the clamping cone 213 move with respect to the pipeline 207.

The adapter 201 is pushed into the connecting sleeve 214 as far as the stop 216. Since the clamping cone 213 is designed conically on the outside, and since the connecting sleeve 214 is likewise designed conically on the inside, the clamping cone 213 and therefore also the toothed ring 212 are pressed together in the radial direction, that is to say in the direction of the outer wall of the pipeline 207, as a consequence of this axial movement. In contrast to many other quick-action couplings, for example those with a bayonet fastening or a union nut, coupling is not made by means of a rotational or screwing movement, but by means of a linear pushing movement. The adapter 201 is slipped onto the end 206 of the pipeline 207 with a push in the axial direction and can be connected, without a tool, first to the pipeline 207 and subsequently to the pipe connection part 202 or to the module 202.

The toothed ring 212 made from metal has, on the inner circumference, a multiplicity of teeth 222 arranged in a distributed manner, of which two teeth 222 can be seen in FIG. 15. The metal teeth 222 cut into the outer wall of the plastic pipeline 207. The clamping cone 213 is no longer visible in the inspection window 209. By observing the signal, perceptible audibly and by feel, from the latching noses 220 which jump over the latching steps 219, and by observing the inspection window 209, the installer can make sure that the adapter 201 has been connected to the end 206 of the pipeline 207 securely and completely. A clamping cone 213 cannot be seen in the inspection window or inspection windows 209, but only the latching fingers 215 or, depending on the annular position of the connecting sleeve 214 with respect to the latching fingers 215, the outer wall of the pipe 207. In the state shown in FIG. 15, the pipeline system is still pressureless, that is to say the adapter has not yet been connected to the pipe connection part 202 or to the module 202 and medium pressure still does not act on the pipeline system.

FIG. 16 shows once again the connection of the adapter 201 to the end 206 of the pipeline 207. In the state shown in FIG. 16, in contrast to the state shown in FIG. 15, the adapter 201 has been connected to the pipe connection part 202, not illustrated here, and the pipeline system has been subjected to medium pressure. Due to the medium pressure, the pipeline 207 and the clamping cone 213 are pressed slightly out of the adapter 201.

Figure 16:
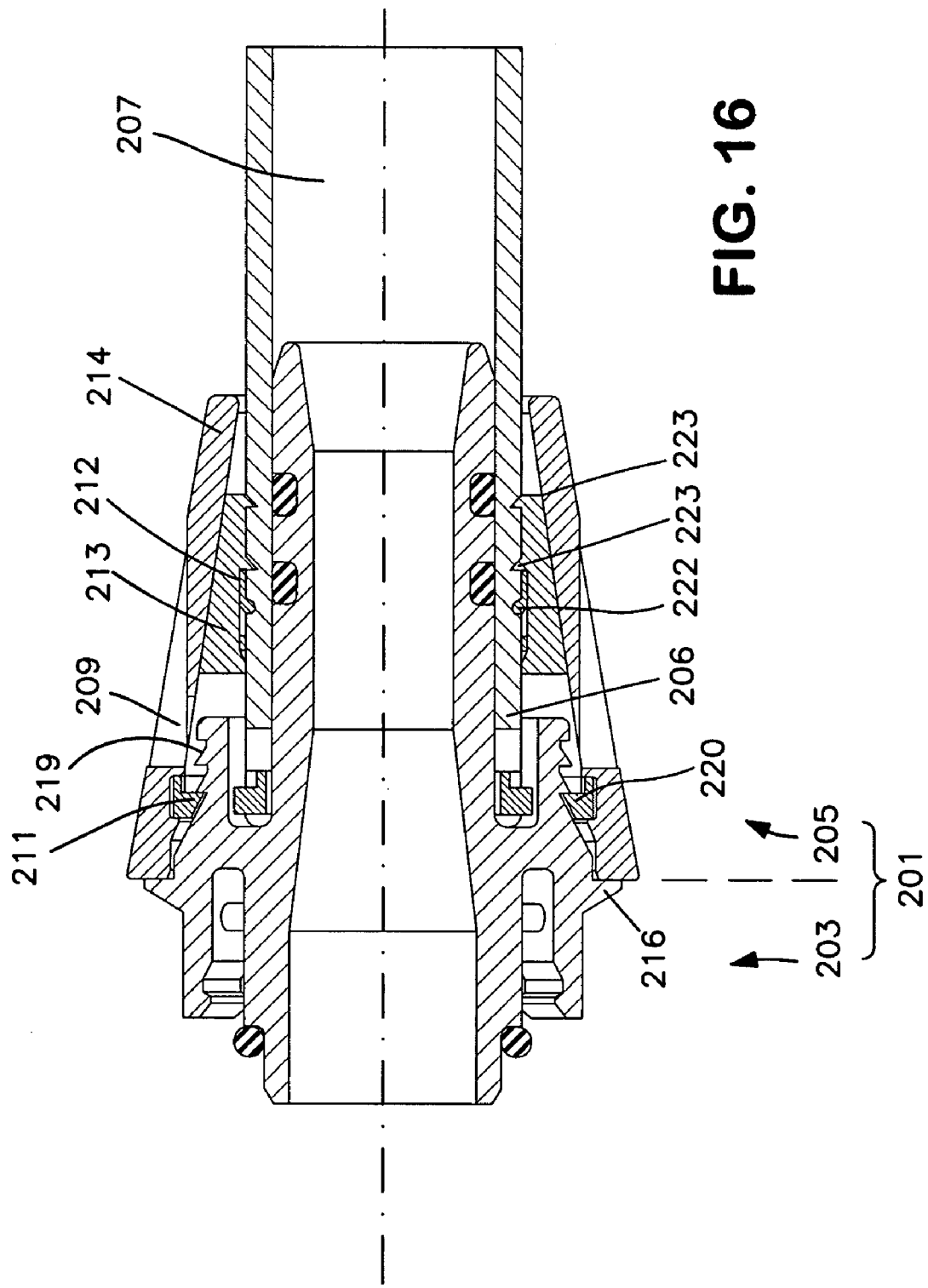
FIG. 16 shows a section through the adapter of FIG. 15 in a pipeline system subjected to the pressure of the medium.

This state is illustrated, slightly exaggerated, in FIG. 16, in order to understand the conditions more clearly. Owing to the pull-out movement of the clamping cone 213 as a consequence of the pressure rise, said clamping cone being held radially by the connecting sleeve 214, the diameter will be further reduced. The teeth 221 of the toothed ring 212 are cut further into the outer wall of the pipeline end 206. In the regions of the toothed ring 212 where there are no teeth 222 stamped away inward, the toothed ring has an essentially cylindrical profile and will come to lie flat on the outer wall of the pipeline 207. The special profile of the toothed ring 212 prevents the metal teeth 222 from cutting too deeply into the plastic material. The special design of the inner wall of the clamping cone 213 with a likewise cylindrical region and with further plastic teeth 223 also contributes to ensuring that the teeth 222, 223 do not cut into the plastic material more deeply than an exactly defined depth. This prevents the pipeline end 206 from being cut off by the metal teeth 222 in the event of an excessive pull-out force.

Figure 17:
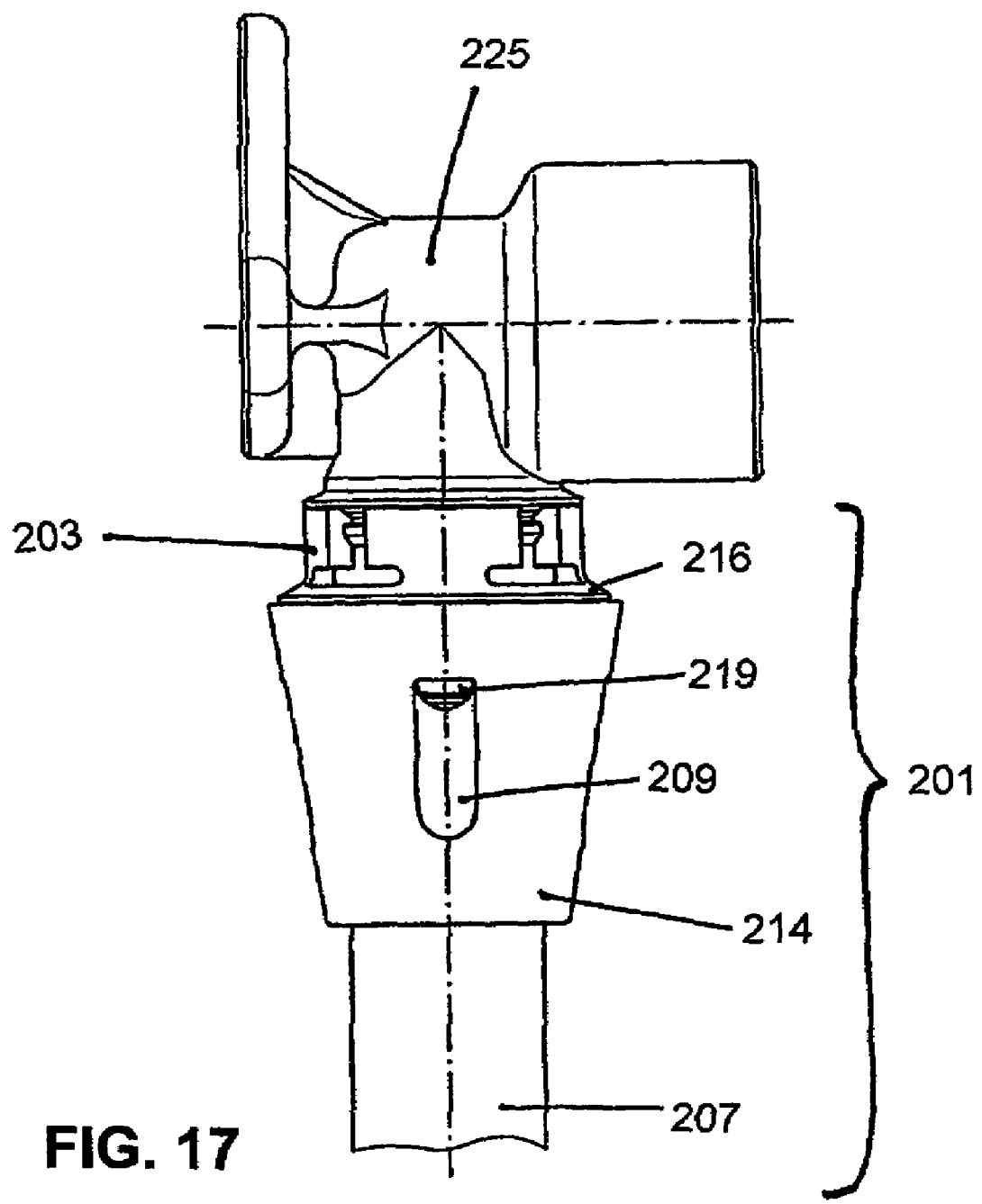
Figure 18:
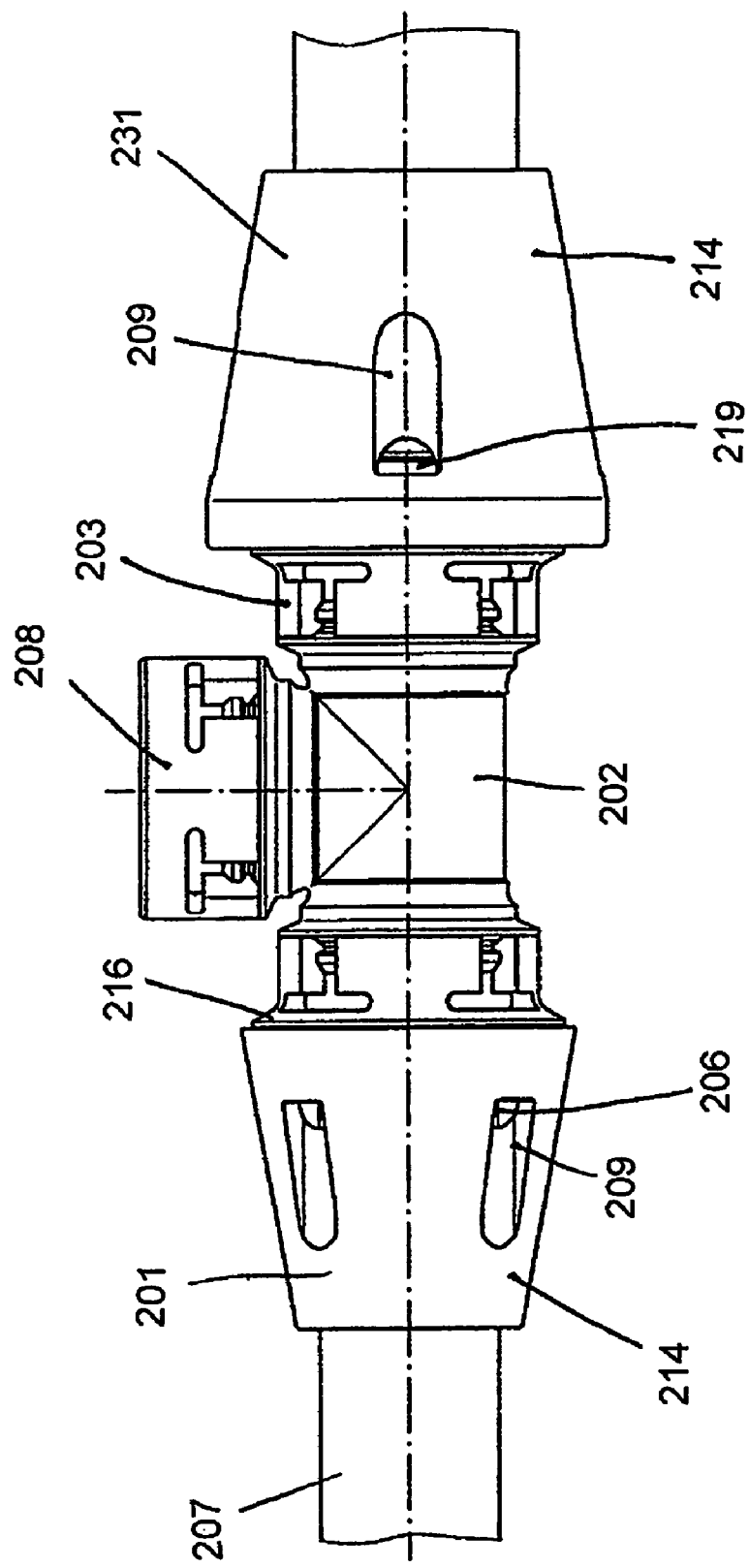

FIGS. 17 to 19 illustrate further applications of the quick-action coupling. FIG. 17 shows the quick-action coupling from FIGS. 11 to 16 in conjunction with a connection 225 for fittings in the sanitary sector.

FIG. 18 shows a pipe connection part 202 with a blind plug 208 and with two adapters 201, 231. The adapter 231 has a larger diameter than the adapter 201. This is intended to indicate that, using the same module 202, reductions or transitions with a different diameter can also be produced. The module 202 may be produced from plastic or from metal and is thus adaptable to different pipeline materials.

FIG. 19 illustrates two adapters 201 and two modules 202 which are connected to one another by means of an intermediate piece 232. The intermediate piece 232 has, on two opposite sides, coupling regions 235 which are designed identically to the coupling regions 205 from FIGS. 11 to 16. This is intended to indicate that what are known as manifolds or distributor fittings can also be produced by means of any number of modules 202 and intermediate pieces 232. Instead of a further module 202, a transition piece 236 with a thread, for example an external thread, may also be slipped onto the intermediate piece 232. The design of the coupling region 235 is illustrated in FIG. 19 with four outer part-circular and resilient regions 238 having latching hooks 239. The latching hooks 239 in FIG. 19 are designed to point radially inward, but, in a correspondingly reversed design of the coupling region 235, may also be designed to point outward.

The advantages associated with the invention lie, in particular, in a simple premounting of the quick-action coupling itself. On the other hand, it affords a secure connection of the pipeline to the coupling. The quick-action coupling is distinguished by particularly few individual parts which can easily be produced.

The invention claimed is:

1. A quick-action coupling for coupling pipes comprising:
    a tubular inner part having an outer surface for supporting a pipe to be coupled;
    an inner sleeve and a clamping ring, each surrounding at least a portion of the tubular inner part for clamping the pipe to be coupled between the outer surface of the tubular inner part and the clamping ring;
    a toothed ring between the inner sleeve and the clamping ring; and
    an outer sleeve surrounding at least a portion of the inner sleeve, the toothed ring and the clamping ring, the outer sleeve comprises a cylindrical region having at least two inside diameters ($d_1$, $d_2$) and a conical region, wherein the clamping ring is received in the conical region.

2. The quick-action coupling as claimed in claim 1, wherein the inner sleeve comprises two substantially identical semicircular shell parts.

3. The quick-action coupling as claimed in claim 2, wherein the two semicircular shell parts forming the inner sleeve are provided with an external thread onto which the outer sleeve, provided with an internal thread, is screwed.

4. The quick-action coupling as claimed in claim 1, wherein the inner sleeve has fingers with radially outward-pointing finger surfaces for holding the toothed ring.

5. The quick-action coupling as claimed in claim 1, wherein the inner sleeve has, on an inner circumference, two inwardly directed peripheral projections which form a peripheral groove for receiving a further projection on the tubular inner part.

6. The quick-action coupling as claimed in claim 1, wherein the clamping ring comprises a split ring having a slot means in the circumferential direction for pretensioning in the conical region of the outer sleeve.

7. The quick-action coupling as claimed in claim 1, wherein the clamping ring has at least one projection on an inner circumference.

8. The quick-action coupling as claimed in claim 1, wherein the inner sleeve has, on an outer circumference, a stop for abutting the outer sleeve.

9. The quick-action coupling as claimed in claim 1, wherein the tubular inner part has at least two tubular regions having different outside diameters.

10. The quick-action coupling as claimed in claim 1, wherein the tubular inner part has at least two grooves for receiving O-ring seals for sealing off the inner part relative to a pipeline and a pipe connection part.

11. The quick-action coupling as claimed in claim 1, wherein the toothed ring includes a plurality of teeth extending from an inner surface of the toothed ring.

12. The quick-action coupling as claimed in claim 1, wherein the toothed ring is closed in the circumferential direction.

13. The quick-action coupling as claimed in claim 1, wherein at least one of the outer sleeve and the inner sleeve is transparent.

14. The quick-action coupling as claimed in claim 1, wherein the outer sleeve has internal threads and is screwed onto external threads on the inner sleeve.

* * * * *